United States Patent
Bodenhamer, Jr. et al.

(10) Patent No.: US 7,439,857 B1
(45) Date of Patent: Oct. 21, 2008

(54) BATHROOM SERVICING REQUEST COMMUNICATION DEVICES AND METHOD

(76) Inventors: William Bodenhamer, Jr., 3930 NE. 31st Ave., Lighthouse Point, FL (US) 33064; Allen D. Hertz, 12784 Tulipwood Cir., Boca Raton, FL (US) 33064; Thomas J. Pughe, 3941 NE. 31st Ave., Lighthouse Point, FL (US) 33064

(*) Notice: Subject to any disclaimer, the term of this patent is extended or adjusted under 35 U.S.C. 154(b) by 188 days.

(21) Appl. No.: 11/402,365

(22) Filed: Apr. 10, 2006

(51) Int. Cl.
    *G08B 21/00* (2006.01)
(52) U.S. Cl. ............. 340/540; 340/286.07; 340/286.09; 340/286.02; 340/286.06
(58) Field of Classification Search .............. 340/540, 340/326, 332, 286.07, 286.09, 286.02, 286.06, 340/286.11; 4/662, 664
    See application file for complete search history.

(56) References Cited

U.S. PATENT DOCUMENTS

| | | | | |
|---|---|---|---|---|
| 5,561,412 A | * | 10/1996 | Novak et al. | 340/286.07 |
| 5,828,294 A | * | 10/1998 | Shank | 340/326 |
| 6,819,238 B2 | * | 11/2004 | Pecora et al. | 340/540 |
| 7,180,405 B2 | * | 2/2007 | Foster et al. | 340/286.09 |

* cited by examiner

*Primary Examiner*—Anh V La
(74) *Attorney, Agent, or Firm*—Allen D. Hertz (57) ABSTRACT

The present invention describes a restroom attendant system. The restroom attendant system utilizes a notification device placed in a restroom. A patron would select a request for service button when the patron recognizes that the restroom needs servicing. The notification device can include a cancel feature as well as indicators to indicate when a request for service is in process and if the restroom is considered cleaned. The notification device would communicate with either a main terminal or a service person. The main terminal can further monitor the time between cleanings and request that a restroom be serviced should the time since the previous servicing exceeds an acceptable time-span. The information can be stored, printed, and uploaded to a central receiving station.

8 Claims, 6 Drawing Sheets

FIG. 6

BATHROOM SERVICING REQUEST COMMUNICATION DEVICES AND METHOD

FIELD of the INVENTION

This invention relates in general to an apparatus and method for courtesy notification and requests for service of a bathroom.

BACKGROUND OF THE INVENTION

The present invention is generally related to the use of a messaging device to notify a service provider that a consumer is requesting a service.

Consumers utilize direct communication for requests for service. Such activities include:

Requesting that a restroom be cleaned. Such an action is accomplished by finding a manager or service person affiliated with the facility/building. This can be embarrassing should the requester be the party that is responsible for the required cleaning.

On occasion, a customer would enter a restroom and either by the customer's actions or actions of another, the restroom would need servicing. Requesting servicing can be time consuming and/or embarrassing. It normally takes an effort to find a service person or a respective manager to request that the restroom be serviced. Additionally, if you were just entering the restroom, you would prefer to use the restroom rather than waste time finding a person to service it. Should you be the party that causes the request for servicing, you might be embarrassed to request a servicing.

Restrooms in certain public facilities such as restaurants require inspection in predetermined intervals, normally once every hour. The establishment is required to maintain a log of the inspections/cleaning of the restroom. This is currently done manually.

What is desired is a means to a service person of a request in an efficient and inexpensive manner.

SUMMARY OF THE INVENTION

The present invention addresses the deficiencies in the present state of customer service.

A first aspect to the present invention is the ability to notify a service person of a request.

A second aspect to the present invention is the inclusion of a wireless transmitter.

A third aspect to the present invention is the inclusion of an automatic communications system.

A fourth aspect to the present invention is the inclusion of an automatic communications system, wherein said automatic communications system utilizes an automatic transmission system.

A fifth aspect to the present invention is the inclusion of an automatic communications system, wherein said automatic communications system utilizes an acknowledging transmission system.

A sixth aspect to the present invention is the inclusion of an automatic communications system, wherein said automatic communications system utilizes an Ethernet access system.

A seventh aspect to the present invention is the utilization of at least one input device.

An eighth aspect to the present invention is the utilization of at least one input device, wherein said input device is a touch screen.

A ninth aspect to the present invention is the utilization of at least one input device, wherein said input device is at least one push button.

A tenth aspect to the present invention is the utilization of at least one input device, wherein said input device is plurality of push buttons.

An eleventh aspect to the present invention is the utilization of at least one input device, wherein said input device is a plurality of push buttons, wherein said function of each push button can be preprogrammed allowing the system to change what each button represents. The function is then presented to the user by a specific label.

A twelfth aspect to the present invention is a restroom attendant, referred to as a bathroom Buddy™.

A thirteenth aspect to the present invention is a restroom attendant, referred to as a bathroom Buddy™, wherein said restroom attendant comprising an apparatus designed to be located in a restroom to remotely notify a party that the restroom needs servicing.

A fourteenth aspect to the present invention is a restroom attendant, referred to as a bathroom Buddy™, wherein said restroom attendant comprising an apparatus designed to be located in a restroom to remotely notify a party that the restroom needs servicing, wherein said bathroom Buddy™ communicates using wireless technology.

A fifteenth aspect to the present invention is a restroom attendant, referred to as a bathroom Buddy™, wherein said bathroom buddy further comprising a main terminal.

A sixteenth aspect to the present invention is a restroom attendant, referred to as a bathroom Buddy™, wherein said bathroom buddy connects to said main terminal via a wired connection.

A seventeenth aspect to the present invention is a restroom attendant, referred to as a bathroom Buddy™, wherein said bathroom buddy connects to said main terminal via a wireless connection.

An eighteenth aspect to the present invention is a restroom attendant, referred to as a bathroom Buddy™, wherein said bathroom buddy communicates to a service person via a wireless connection.

A nineteenth aspect to the present invention is a restroom attendant, referred to as a bathroom Buddy™, said bathroom buddy comprising a transmitter.

A twentieth aspect to the present invention is a restroom attendant, referred to as a bathroom Buddy™, said bathroom buddy comprising a transceiver.

A twenty-first aspect to the present invention is a restroom attendant, referred to as a bathroom Buddy™, said bathroom buddy comprising a power supply.

A twenty-second aspect to the present invention is a restroom attendant, referred to as a bathroom Buddy™, said bathroom buddy comprising a power supply, wherein said power supply is a battery.

A twenty-third aspect to the present invention is a restroom attendant, referred to as a bathroom Buddy™, said bathroom buddy comprising a power supply, wherein said power supply is a battery, and further comprising a battery monitoring circuit.

A twenty-fourth aspect to the present invention is a restroom attendant, referred to as a bathroom Buddy™, said bathroom buddy comprising a power supply, wherein said power supply is a battery, and further comprising a battery monitoring circuit and a means for notifying a party of a low battery status.

A twenty-fifth aspect to the present invention is a restroom attendant, referred to as a bathroom Buddy™, said bathroom buddy comprising a requesting apparatus, such as a push button, a toggle switch, and the like.

A twenty-sixth aspect to the present invention is a restroom attendant, referred to as a bathroom Buddy™, said bathroom buddy comprising a notification circuit, wherein said notification circuit monitors the change of said requesting apparatus.

A twenty-seventh aspect to the present invention is a restroom attendant, referred to as a bathroom Buddy™, said bathroom Buddy™ comprising a notification circuit, wherein said notification circuit transmits a message requesting servicing of the bathroom.

A twenty-eighth aspect to the present invention is a restroom attendant, referred to as a bathroom Buddy™, said bathroom buddy comprising a notification circuit, wherein said notification circuit transmits a message requesting servicing of the bathroom, further identifying the specific bathroom.

A twenty-ninth aspect to the present invention is a restroom attendant, referred to as a bathroom Buddy™, said bathroom buddy comprising a receiving circuit, wherein said receiving circuit can receive messages from said main terminal.

A thirtieth aspect to the present invention is a restroom attendant, referred to as a bathroom Buddy™, said bathroom buddy comprising a cancel request circuit, wherein said cancel request comprising the same features of the request servicing circuit.

A thirty-first aspect to the present invention is a restroom attendant, referred to as a bathroom Buddy™, said bathroom buddy comprising a user interface to indicate the status of the bathroom Buddy™.

A thirty-second aspect to the present invention is a restroom attendant, referred to as a bathroom Buddy™, wherein said user interface is at least one of a light, LED, and LCD.

A thirty-third aspect to the present invention is a restroom attendant, referred to as a bathroom Buddy™, said restroom attendant further comprising a user interface to identify the time.

A thirty-fourth aspect to the present invention is a restroom attendant, referred to as a bathroom Buddy™, said restroom attendant further comprising a user interface to identify the time of the most recent servicing.

A thirty-fifth aspect to the present invention is a restroom attendant, wherein said main terminal comprising a wireless receiver.

A thirty-sixth aspect to the present invention is a restroom attendant, wherein said main terminal comprising a wireless transceiver.

A thirty-seventh aspect to the present invention is a restroom attendant, wherein said main terminal comprising a method for identifying each of the monitored bathrooms.

A thirty-eighth aspect to the present invention is a restroom attendant, wherein said main terminal comprising a clock and presenting the current time.

A thirty-ninth aspect to the present invention is a restroom attendant, wherein said main terminal comprising a method for identifying that a restroom needs attending.

A fortieth aspect to the present invention is a restroom attendant, wherein said main terminal comprising a method for identifying that a restroom needs attending, wherein said method determines the need to inspect/clean the restroom based upon a predetermined time difference from the time of previous servicing.

A forty-first aspect to the present invention is a restroom attendant, wherein said main terminal comprising a method for identifying that a restroom is considered clean.

A forty-second aspect to the present invention is a restroom attendant, wherein said main terminal comprising a method for identifying that a restroom is considered clean, further providing the time in which each specific restroom was previously cleaned.

A forty-third aspect to the present invention is a restroom attendant, wherein said main terminal comprising an input device, wherein said service person can indicate that a respective restroom has been serviced.

A forty-fourth aspect to the present invention is a restroom attendant, wherein said main terminal comprising a touch screen input device, wherein said service person can touch the respective cleaned section to indicate the referenced restroom has been serviced.

A forty-fifth aspect to the present invention is a restroom attendant, wherein said main terminal comprising a touch screen input device, wherein a method to identify that a specific restroom needs attending is presented by a change in color.

A forty-sixth aspect to the present invention is a restroom attendant, wherein said main terminal comprising a touch screen input device, wherein a method to identify that a specific restroom needs attending is presented by illuminating a light.

A forty-seventh aspect to the present invention is a restroom attendant, wherein said main terminal communicates back to said restroom to identify that said bathroom has been attended to.

A forty-eighth aspect to the present invention is a restroom attendant; wherein said restroom attendant comprising a user entry interface to allow the service person to indicate that the restroom has been attended to.

A forty-ninth aspect to the present invention is a restroom attendant, utilizes a hopping network of transceivers to ensure broader area coverage.

A fiftieth aspect to the present invention is a restroom attendant, utilizes a mesh network of transceivers to ensure broader area coverage.

A fifty-first aspect to the present invention is a method for servicing a restroom, said method comprising the steps:
  a. selecting a request for servicing feature on a restroom attendant;
  b. communicating between a restroom attendant and a main terminal;
  c. indicating that a restroom needs attending on a main terminal;
  d. service person recognizes the request for servicing of a restroom;
  e. servicing the restroom respective to the indication presented;
  f. instructing the system that service for a restroom has been completed.

A fifty-second aspect to the present invention is a method for servicing a restroom, said method comprising the steps:
  a. selecting a request for servicing feature on a restroom attendant;
  b. communicating between a restroom attendant and a selective call receiver;
  c. indicating that a restroom needs attending on a selective call receiver;
  d. service person recognizes the request for servicing of a restroom;
  e. servicing the restroom respective to the indication presented; and
  f. instructing the system that service for a restroom has been completed.

A fifty-third aspect to the present invention is a method for servicing a restroom, said method comprising the steps:
   a. determining that a restroom needs cleaning based upon a predetermined time and the time of the most recent servicing;
   b. indicating that a restroom needs attending on a main terminal;
   c. service person recognizes the request for servicing of a restroom;
   d. servicing the restroom respective to the indication presented; and
   e. instructing the system that service for a restroom has been completed A fifty-fourth aspect to the present invention is a method for servicing a restroom, said method comprising the steps:
   a. determining that a restroom needs cleaning based upon a predetermined time and the time of the most recent servicing;
   b. indicating that a restroom needs attending on a selective call receiver;
   c. service person recognizes the request for servicing of a restroom;
   d. servicing the restroom respective to the indication presented; and
   e. instructing the system that service for a restroom has been completed.

A fifty-fifth aspect to the present invention is a method for servicing a restroom, said method further comprising the steps of maintaining a log of the bathroom cleaning activities.

A fifty-sixth aspect to the present invention is a method for servicing a restroom, said method further comprising the steps of maintaining a log of the bathroom cleaning activities, and further uploading the log of bathroom cleaning activities.

A fifty-seventh aspect to the present invention is a method for servicing a restroom, said method further comprising the steps of maintaining a log of the bathroom cleaning activities, and further uploading the log of bathroom cleaning activities to a corporate data receiving location.

A fifty-eighth aspect to the present invention is an entry apparatus allowing a customer to indicate that a bathroom was considered clean for quality feedback.

A fifty-ninth aspect to the present invention is an entry apparatus allowing a customer to indicate that a bathroom was considered clean for quality feedback, wherein said quality feedback is further tallied.

A sixtieth aspect to the present invention is an entry apparatus allowing a customer to indicate that a bathroom was considered clean for quality feedback, wherein said quality feedback is further tallied and forwarded to a corporate recording location.

A sixty-first aspect to the present invention is the inclusion of a switch cover over the Bathroom Buddy™ apparatus to minimize false activations.

BRIEF DESCRIPTION OF THE DRAWINGS

For the purpose of initially illustrating the invention, there is shown in illustrations and flow diagrams, an embodiment that is presently preferred as well as alternate embodiments. It is understood, however, that the present invention is not limited to the specific instrumentalities and methods disclosed. It can be recognized that such figures represent a method and the associated apparatuses required to make the method in which persons skilled in the art may make various flow, design, and interface diagrams from therein. In the drawings.

DETAILED DESCRIPTION OF THE DRAWINGS

Figure 1:
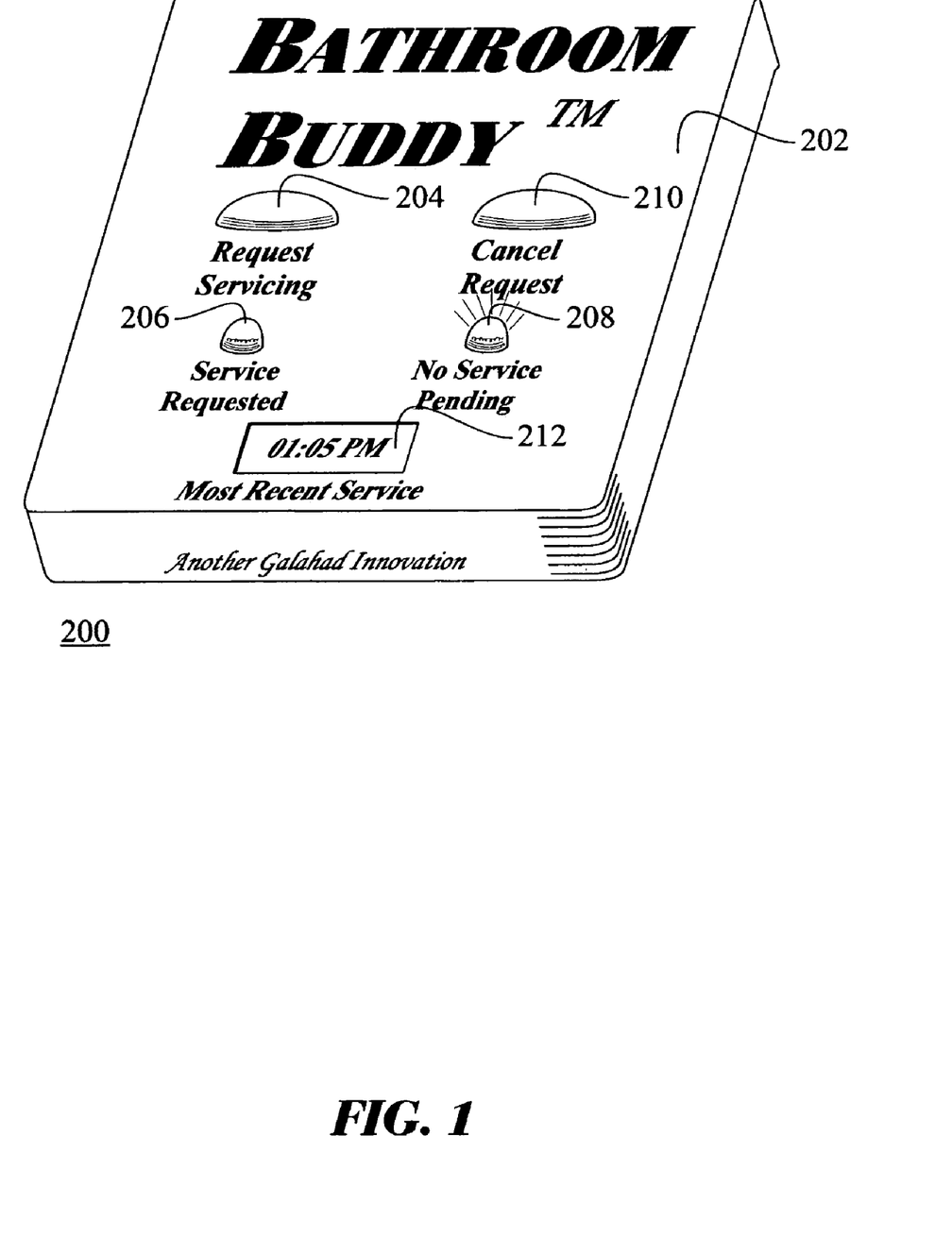
FIG. 1 is an isometric illustration presenting a first portion of a bathroom attending apparatus, more specifically a bathroom attending transmission device that would be located proximate a bathroom.

FIG. 1 is an isometric illustration presenting a first portion of a bathroom attending apparatus 200, wherein said bathroom attending apparatus 200 comprising an bathroom attending housing 202, attending circuitry (not shown), attending software (not shown), attending transmitter (not shown), a request service user entry 204, an optional cancel request user entry 210, a service requested identifier 206, and a considered clean identifier 208. Said bathroom attending apparatus 200 would preferably be powered by a portable power source such as a rechargeable battery, making installation simple. In the same light, the transmitter would be a wireless transmitter such as a local 900 MHz or 2.4 GHz radio. In the same light, said bathroom attending apparatus 200 could be easily installed using double sided adhesive tape.

A user would request the bathroom be tended to by depressing said request service user entry 204. Said bathroom attending apparatus 200 would then recognize the request and transmit a message to a restroom attendant main terminal (introduced as restroom attendant main terminal 220 of FIG. 2). In conjunction with the request, said service requested identifier 206 would illuminate indicating that a service request has been made, but not completed. Upon completion of attending to the bathroom, the service person can select said cancel request user entry 210, in which said considered clean identifier 208 would illuminate and said service requested identifier 206 would turn off. Additionally, when cancelled, said bathroom attending apparatus 200 would transmit a cancel/clean message to said restroom attendant main terminal. Said bathroom attending apparatus 200 can optionally comprise a prior service time identifier 212 to present when the most recent service was completed. Said prior service time identifier 212 can be an LED bank, a LCD, and the like.

Figure 2:
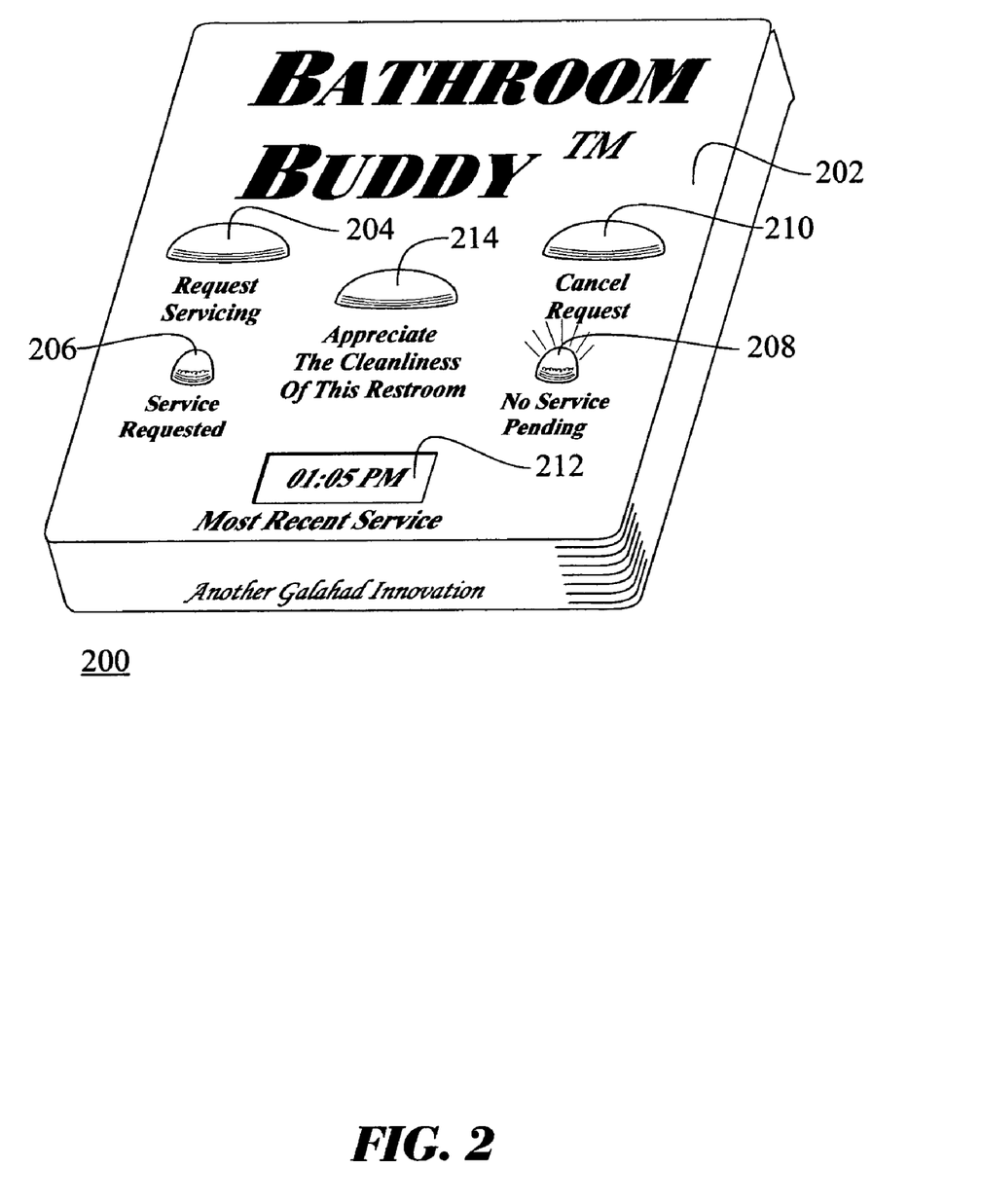
FIG. 2 is an isometric illustration comprising the elements of FIG. 1, further introducing a quality feedback member.

FIG. 2 comprising the features of FIG. 1, further introducing a cleanliness recognition input apparatus 214. Said cleanliness recognition input apparatus 214 provides patrons the ability to acknowledge a clean restroom. Upon activating said cleanliness recognition input apparatus 214, the unit would communicate that a patron believes that the restroom is clean to a receiving base station (see FIG. 3 herein). Said receiving base station would tally the number of times the restroom cleanliness is acknowledged. This can be uploaded to corporate as a metric for the establishment.

Figure 3:
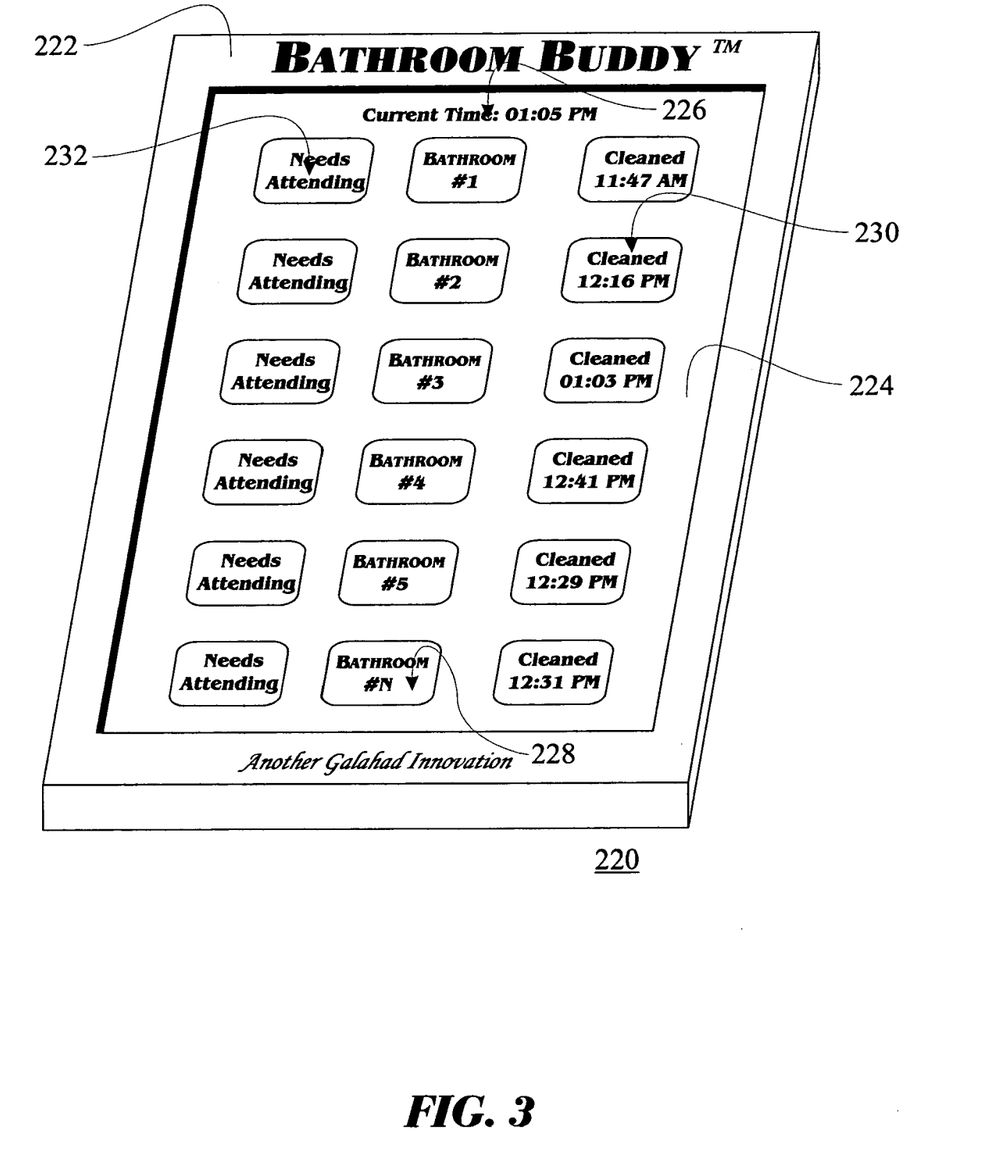
FIG. 3 is an isometric illustration presenting a second portion of a bathroom attending apparatus, more specifically a receiving and monitoring station.

FIG. 3 presents an isometric illustration of said restroom attendant main terminal 220, wherein said restroom attendant main terminal 220 functions in conjunction with said bathroom attending apparatus 200. Said restroom attendant main terminal 220 comprising a transceiver (not shown) a controlling circuit and software (not shown), a power supply (not shown), a terminal housing 222, and a terminal display 224. Said terminal display 224 can present a current time display 226 and a status of each of a plurality of bathrooms that are assigned with said bathroom attending apparatus 200. Such status can be presented as shown, comprising bathroom identifier 228, bathroom last cleaned status 230, and restroom needs attending identifier 232. Said bathroom identifier 228 would provide sufficient information to convey which specific bathroom is referenced to a service person monitoring said restroom attendant main terminal 220. Said bathroom last cleaned status 230 would present the time in which the bathroom was last tended to. The system can comprise software to monitor the time since each bathroom was last tended to and should the time be greater than the regulated time window, the system would place said restroom needs attending identifier 232 into the request for attending mode. Said restroom needs attending identifier 232 could be a light, a color change, flashing, and the like to indicate to a service person monitoring said restroom attendant main terminal 220 that such respective restroom needs tending to.

Further, said terminal display 224 can be a touch screen allowing the service person the ability to contact a feature to indicate that service has been performed for a specific bathroom. The system can optionally transmit a message from said restroom attendant main terminal 220 to said bathroom attending apparatus 200 to indicate that the respective bathroom has been serviced. Upon receipt of such serviced message from said restroom attendant main terminal 220, said bathroom attending apparatus 200 would set the status as considered clean by activating said considered clean identifier 208.

Figure 4:
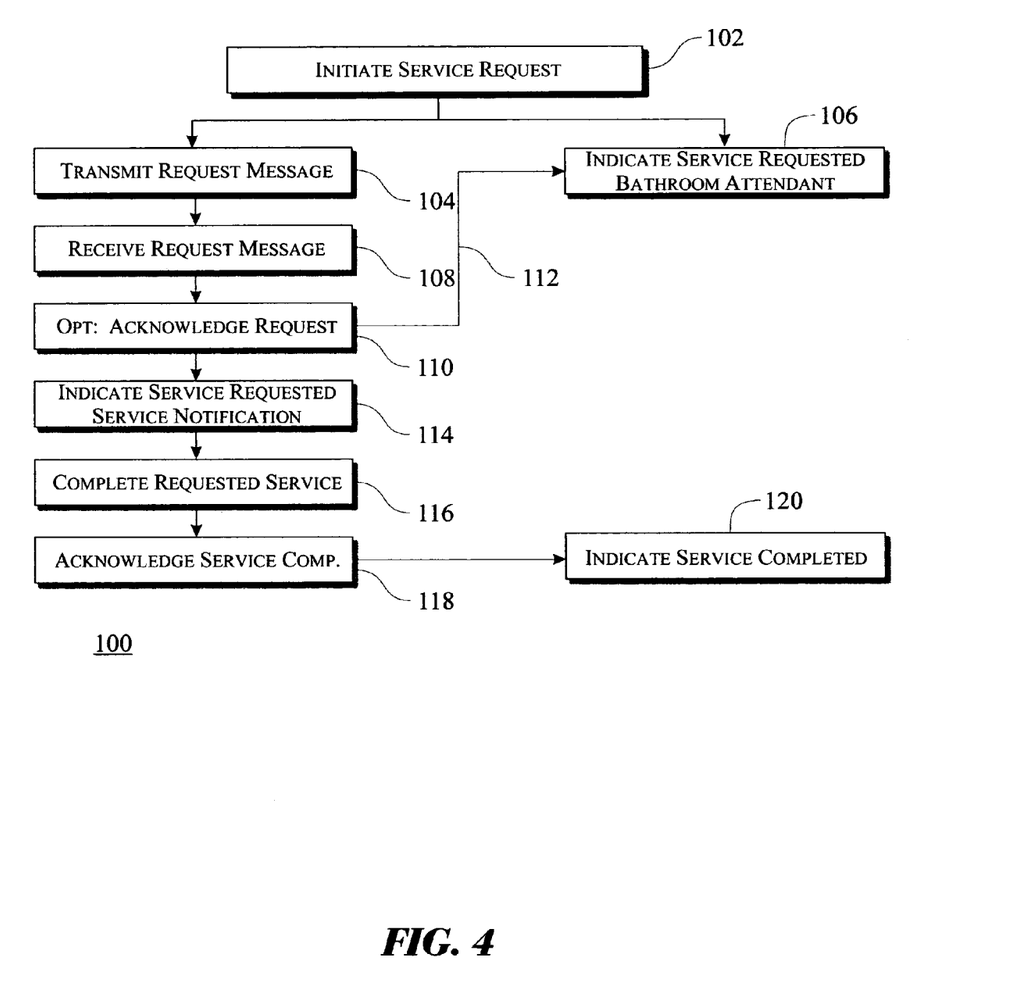
FIG. 4 is a flow diagram presenting a first method of the present invention.

FIG. 4 presents a flow diagram representing a first embodiment of a restroom attendant flow diagram 100, wherein said restroom attendant flow diagram 100 utilizing a bathroom attendant 200 as the driver requesting service. Said restroom attendant flow diagram 100 initiates with an initiate serve request step 102, wherein said initiate serve request step 102 when a party/patron activates said request service user entry 204. Upon activation of said request service user entry 204, said restroom attendant flow diagram 100 continues with two parallel steps: said bathroom attendant 200 would transmit a request for service in accordance with a transmit service request message step 104 and activates said service requested identifier 206 in accordance with a indicate service requested (restroom attendant) step 106. A receiving device would receive and interpret said service request message in accordance with a receive request message step 108. Said receiving device can be a main terminal, a selective call receiver, and the like. Optionally, said receiving device can transmit an acknowledgement back to said bathroom attendant 200 in accordance with a optional acknowledge message step 110. Additionally, said indicate service requested (restroom attendant) step 106 can be optionally driven (alternate indication service flow path 112) by said optional acknowledge message step 110, insuring that the party/patron that requested the servicing is advised that the transmission was received correctly. Upon receipt and interpretation of said service request message, said receiving device would indicate service has been requested in accordance with an indicate service requested (service person notification) step 114. Said indicate service requested (service person notification) step 114 can comprise a variety of methods, including simply stating a number, a reference to a specific restroom, highlighting said bathroom needs attending identifier 232, presenting a message on a selective call receiver, and any other option that would be desired by those skilled in the art. Once notified of the request for service, a service person would accomplish the servicing of the restroom in accordance with a complete requested service step 116. To close the loop on the process, the service person would acknowledge that the service of the specific restroom was completed in accordance with a acknowledge service completed step 118. This can be accomplished in a number of ways, such as by activating said cancel request user entry 210, selecting the respective input denoting a serviced restroom on said bathroom attendant main terminal 220, and the like. Said restroom attendant flow diagram 100 resets via an indicate service completed step 120, wherein said indicate service completed step 120 could active said considered clean identifier 208 on said bathroom attending apparatus 200. Additional, said bathroom attendant main terminal 220 would be revised to properly reflect service completion for the respective restroom. Communications between the various devices would allow the service person to provide a single entry into the system to indicate the servicing, wherein the status identifier(s) would be set accordingly at all respective locations.

Figure 5:
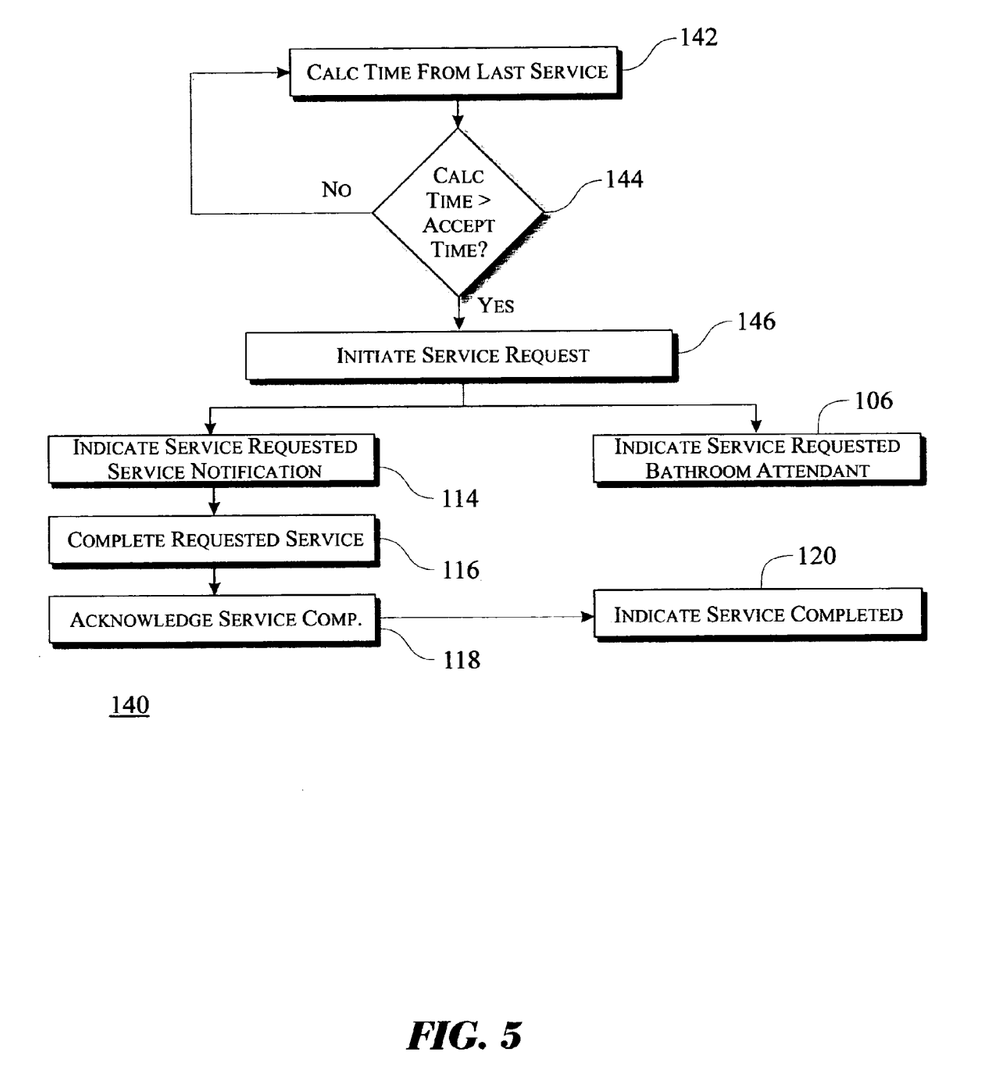
FIG. 5 is a flow diagram presenting an alternate method of the present invention.

FIG. 5 presents a flow diagram representing a second embodiment of a restroom time monitoring flow diagram 140, wherein said restroom time monitoring diagram 140 utilizing a time differential as the driver requesting service. Said restroom attendant flow diagram 100 initiates by determining the amount of time since the most recent servicing of each restroom in accordance with a calculation of time since the previous service step 142. Said amount of time is then compared to a predetermined acceptable time between servicings in accordance with a time delta decision step 144. Should the amount of time since the previous servicing be less than the acceptable amount of time between servicings (NO), said restroom time monitoring flow diagram 140 returns to said calculation of time since the previous service step 142. Should the amount of time since the previous servicing be greater than the acceptable amount of time between servicings (YES), said restroom time monitoring flow diagram 140 proceeds further to a initiate service request step 146. Said initiate service request step 146 can cause two parallel steps: said indicate service requested (service person notification) step 114 and said indicate service requested (restroom attendant) step 106. Said indicate service requested (service person notification) step 114 can comprise a variety of methods, including simply stating a number, a reference to a specific restroom, highlighting said bathroom needs attending identifier 232, presenting a message on a selective call receiver, and any other option that would be desired by those skilled in the art. Once notified of the request for service, a service person would accomplish the servicing of the restroom in accordance with a complete requested service step 116. To close the loop on the process, the service person would acknowledge that the service of the specific restroom was completed in accordance with a acknowledge service completed step 118. This can be accomplished in a number of ways, such as by activating said cancel request user entry 210, selecting the respective input denoting a serviced restroom on said bathroom attendant main terminal 220, and the like. Said restroom attendant flow diagram 100 resets via an indicate service completed step 120, wherein said indicate service completed step 120 could active said considered clean identifier 208 on said bathroom attending apparatus 200. Additional, said bathroom attendant main terminal 220 would be revised to properly reflect service completion for the respective restroom. Communications between the various devices would allow the service person to provide a single entry into the system to indicate the servicing, wherein the status identifier(s) would be set accordingly at all respective locations.

Figure 6:
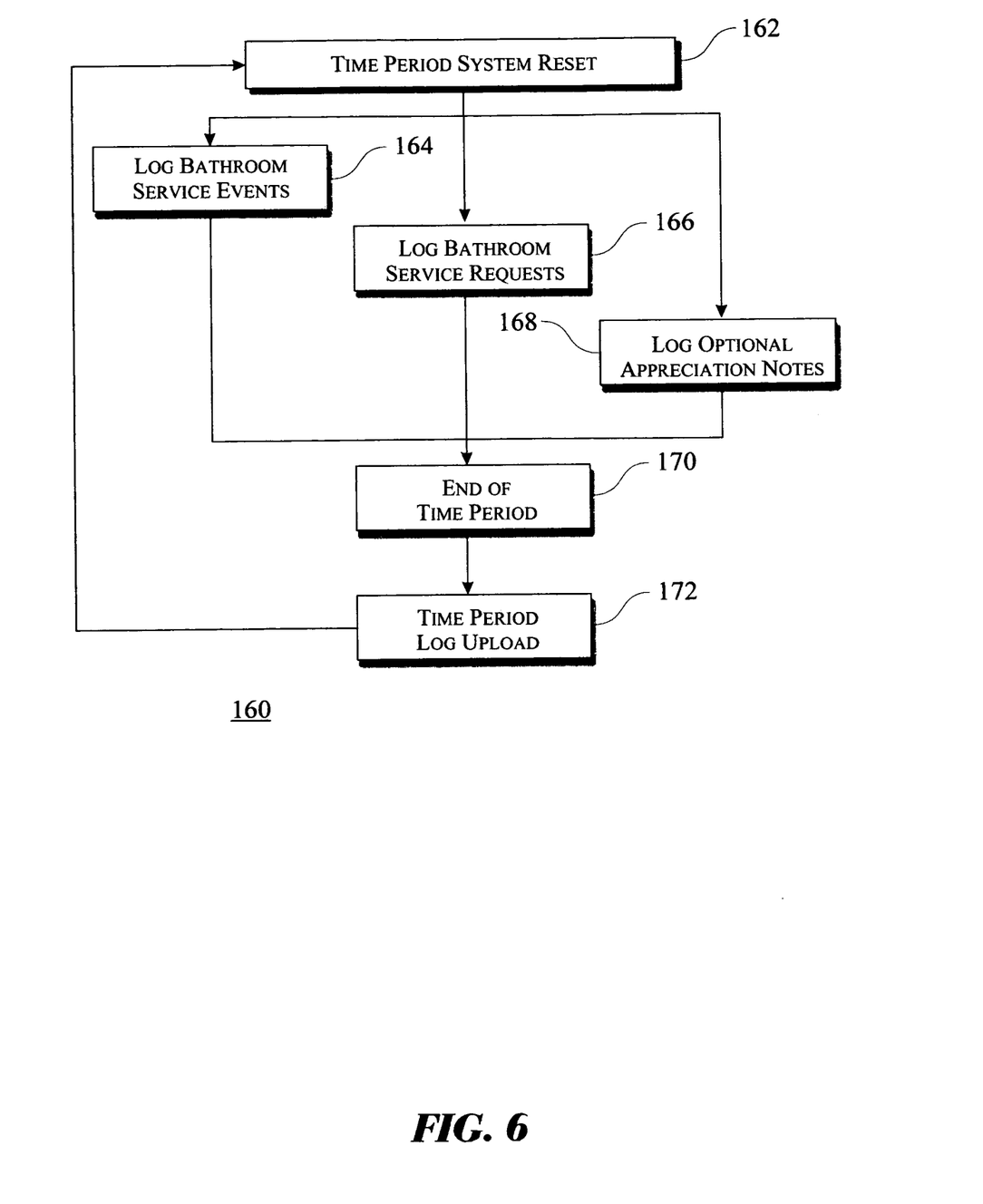
FIG. 6 is a flow diagram presenting a method for providing metrics output files.

FIG. 6 presents a bathroom service log flow diagram 160, said bathroom service log flow diagram 160 comprising the steps of:

a. Initiating with a log time period reset step 162, wherein said bathroom service log flow diagram 160 comprises a predetermined log time period. Said predetermined log time period is utilized to manage the data collection and upload time period cycles. Upon initializing said bathroom service log flow diagram 160 sets a time period counter at zero and initiates data collection.

b. Collecting data respective to bathroom service events in accordance with a log bathroom service events step 164. This would comprise the time in which each bathroom is serviced, the delta between each time the bathroom is serviced, and the like.

c. Collecting data respective to bathroom service requests in accordance with a log bathroom service requests step 166. This would comprise the time in which each bathroom service is requested by said bathroom attending apparatus 200, the delta between each time in which each bathroom service is requested, the total number of times in which said bathroom services are requested, and the like.

d. Collecting data respective to said optional bathroom service appreciation entries in accordance with a log bathroom service appreciation entries step 168. This would comprise the number of times in which the bathroom appreciation entries are submitted by said bathroom attending apparatus 200.

e. Continuing to log each of said respective metrics until said predetermined log time period expires in accordance with an end of time period step 170. Upon recognition of said end of log time period, said bathroom service log flow diagram 160 proceeds by uploading the logged information to a desired location. Said upload is accomplished in accordance with a time period log upload step 172. Upon expiration of said log time period, said bathroom service log flow diagram 160 returns to said log time period reset step 162 to begin obtaining information over the next log time period.

It can be recognized that the embodiments taught herein can be modified by those skilled in the art, all while maintaining the spirit and intent of the present invention. The actual reduction to practice should consider options and only be limited by the elements as claimed herein.

What is claimed is:

1. A method for requesting service to a restroom, said method for requesting service to a restroom comprising the steps:

placing a restroom attending apparatus in a restroom, said restroom attending apparatus comprising:
a user request servicing input device providing the user a device to request servicing, and
a communications transmitting circuit to communicate to a service person that a request for servicing has been made,
selecting said user request servicing input device;
communicating by at least one of a wired and a wireless transmitting circuitry to a service request receiving device; and
said service request receiving device presenting said request for service to the service person;
determining a time since pervious servicing;
comparing said time since previous servicing to a predetermined allowable time span;
determining if a restroom requires servicing based upon a result of comparing said time since previous servicing to the predetermined allowable time span;
requesting servicing of said restroom should the result of determining if a restroom requires servicing based upon the result of comparing said time since previous servicing to the predetermined allowable time span determines such action is required; and
indicating a service is requested for said restroom to the service person.

2. The method of claim 1, said method further comprising the additional steps:
said restroom attending apparatus further indicating an identification;
said service request receiving device interpreting said identification to determine a user understandable restroom identification; and
presenting said user understandable restroom identification for service to the service person.

3. The method of claim 1, said method further comprising the additional steps:
said service person entering a service completed via at least one of a respective user entry on said restroom attending apparatus and a service completed entry on said service request receiving device.

4. The method of claim 2, said method further comprising the additional steps:
said service person entering a service completed via at least one of a respective user entry on said restroom attending apparatus and a service completed entry on said service request receiving device.

5. The method of claim 1, said method further comprising the additional steps:
indicating via a request for service indicator further incorporated in said restroom attending apparatus that a request for service has been made and respective service has not been completed.

6. The method of claim 4, said method further comprising the additional steps:
indicating a time of most recent serving on at least one of a main terminal and said restroom attending apparatus.

7. The method of claim 1, said method further comprising the additional steps:
indicating a time of most recent serving on at least one of a main terminal and said restroom attending apparatus.

8. The method of claim 3, said method further comprising the additional steps:
indicating via a request for service indicator further incorporated in said restroom attending apparatus that a request for service has been made and respective service has not been completed.

* * * * *